United States Patent [19]
Schmidt

[11] 4,358,184
[45] Nov. 9, 1982

[54] COMPACT COLLAPSIBLE MICROFORM VIEWER

[75] Inventor: Detlef E. Schmidt, Malibu, Calif.

[73] Assignee: Topper Manufacturing Corporation, Torrance, Calif.

[21] Appl. No.: 237,688

[22] Filed: Feb. 24, 1981

[51] Int. Cl.³ ........................ G03B 23/08; G03B 21/22
[52] U.S. Cl. ................................. 353/119; 353/27 R; 353/74; 353/77
[58] Field of Search .................. 353/27 R, 72, 73, 79, 353/119, 74, 75, 76, 77, 78

[56] References Cited

U.S. PATENT DOCUMENTS

| | | | |
|---|---|---|---|
| 2,252,513 | 8/1941 | Koehl | 353/119 |
| 2,322,023 | 6/1943 | Hopkins | 88/24 |
| 2,361,398 | 10/1944 | Harris et al. | 88/24 |
| 2,377,476 | 6/1945 | Berglund | 353/79 |
| 2,552,211 | 5/1951 | Perillo | 88/28 |
| 2,634,652 | 4/1953 | Barth | 88/24 |
| 2,847,902 | 8/1958 | D'Incerti | 88/24 |
| 3,185,027 | 5/1965 | Hodges et al. | 88/24 |
| 3,205,771 | 9/1965 | Harrison et al. | 353/79 |
| 3,352,203 | 11/1967 | Barke et al. | 88/24 |
| 3,446,552 | 5/1969 | Gross et al. | 353/27 |
| 3,511,149 | 5/1970 | Blattner et al. | 95/12 |
| 3,572,905 | 3/1971 | Schlapp | 350/257 |
| 3,650,614 | 3/1972 | Shimoda | 353/72 |
| 3,667,839 | 6/1972 | Artaud | 353/77 |
| 3,807,848 | 4/1974 | Shoemaker | 353/72 |
| 3,814,514 | 6/1974 | Douglas | 353/78 |
| 3,838,916 | 10/1974 | Gawin | 353/27 |
| 3,899,246 | 8/1975 | Edelstein | 353/27 |
| 3,917,389 | 11/1975 | Shoji | 353/27 |
| 3,941,467 | 3/1976 | Kapany | 353/34 |
| 4,067,648 | 1/1978 | Spreitzer | 353/27 R |
| 4,213,679 | 7/1980 | Sakamoto et al. | 353/77 |

FOREIGN PATENT DOCUMENTS 1016853 9/1952 France ................................. 353/79

Primary Examiner—Steven L. Stephan
Attorney, Agent, or Firm—Gausewitz, Carr, Rothenberg & Edwards

[57] ABSTRACT

A microform viewer has a case section pivotally mounting a screen, to move from a collapsed position to a viewing position, and slidably receiving a two-part projection section that telescopes into the case section. As the projection section moves into and out of the case section it positively drives the screen between collapsed and display positions. The projection section is made of two mutually separable housings that fit together along the film path so that when the two housings are separated the two pressure plates forming part of the film path are readily accessible.

20 Claims, 14 Drawing Figures

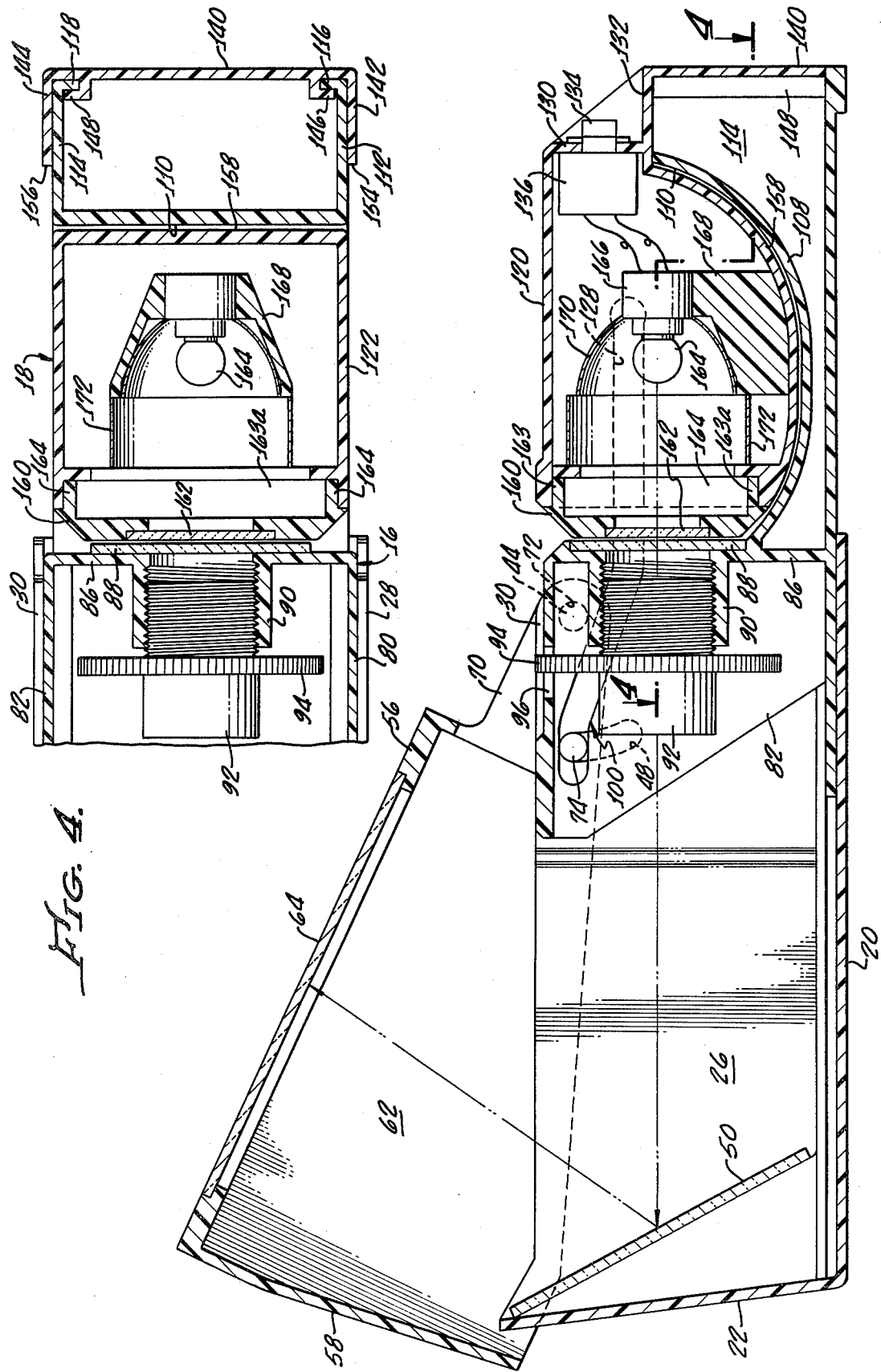

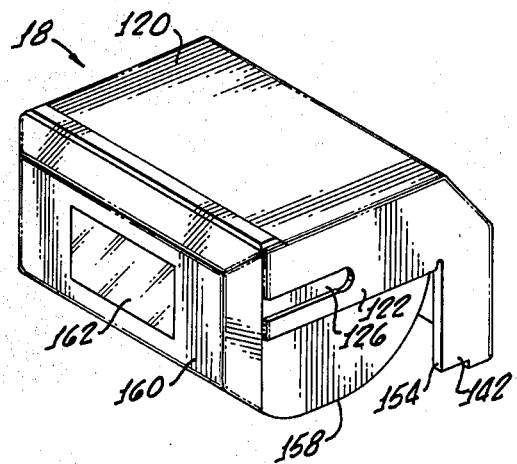
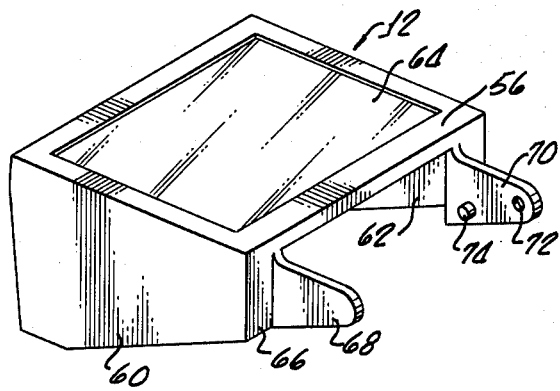
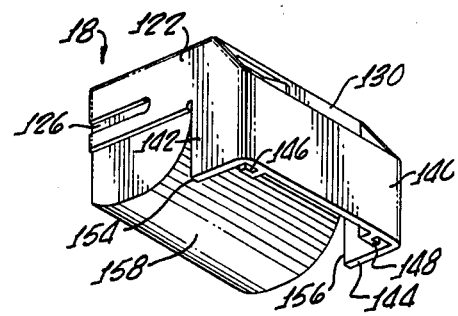
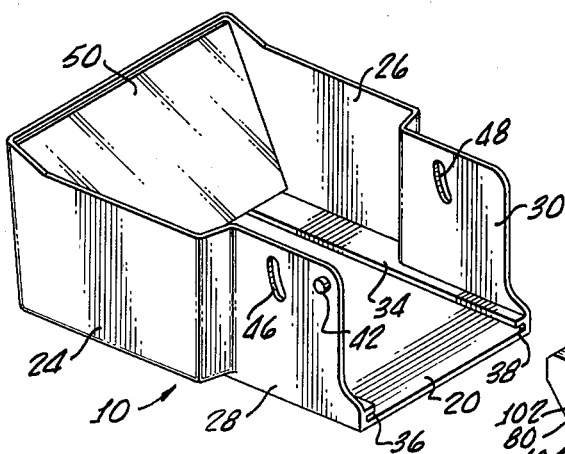
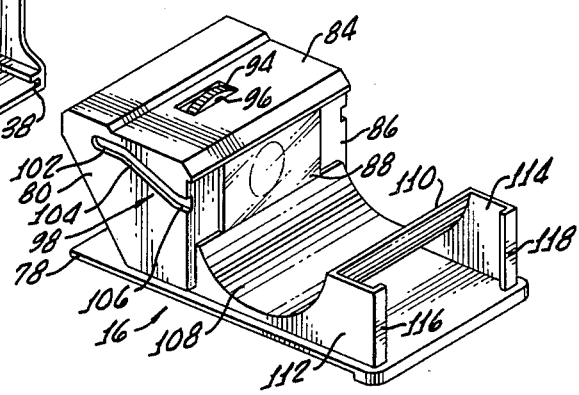

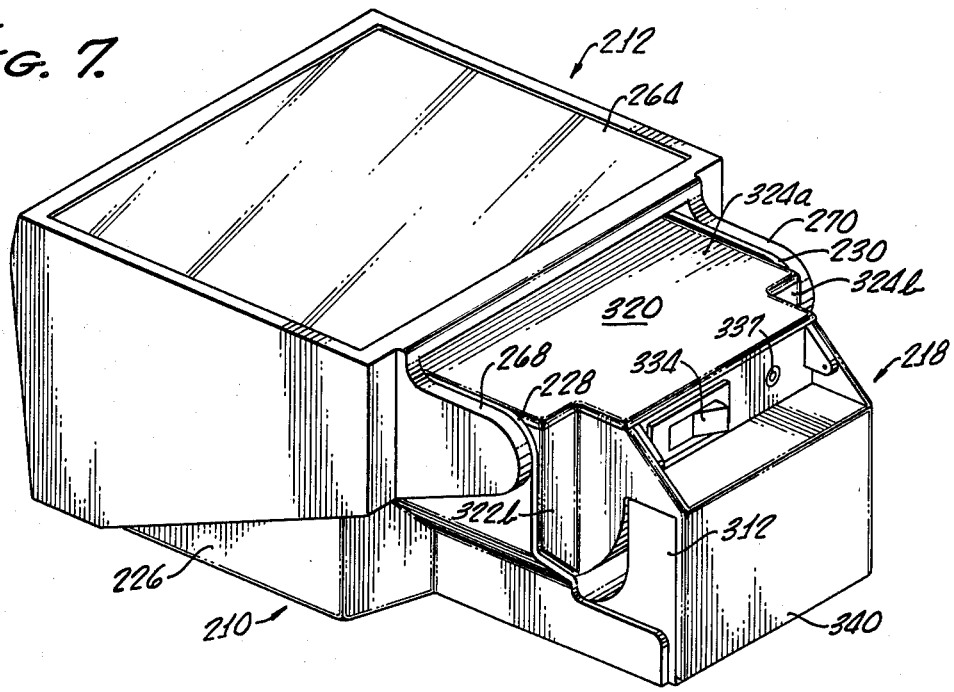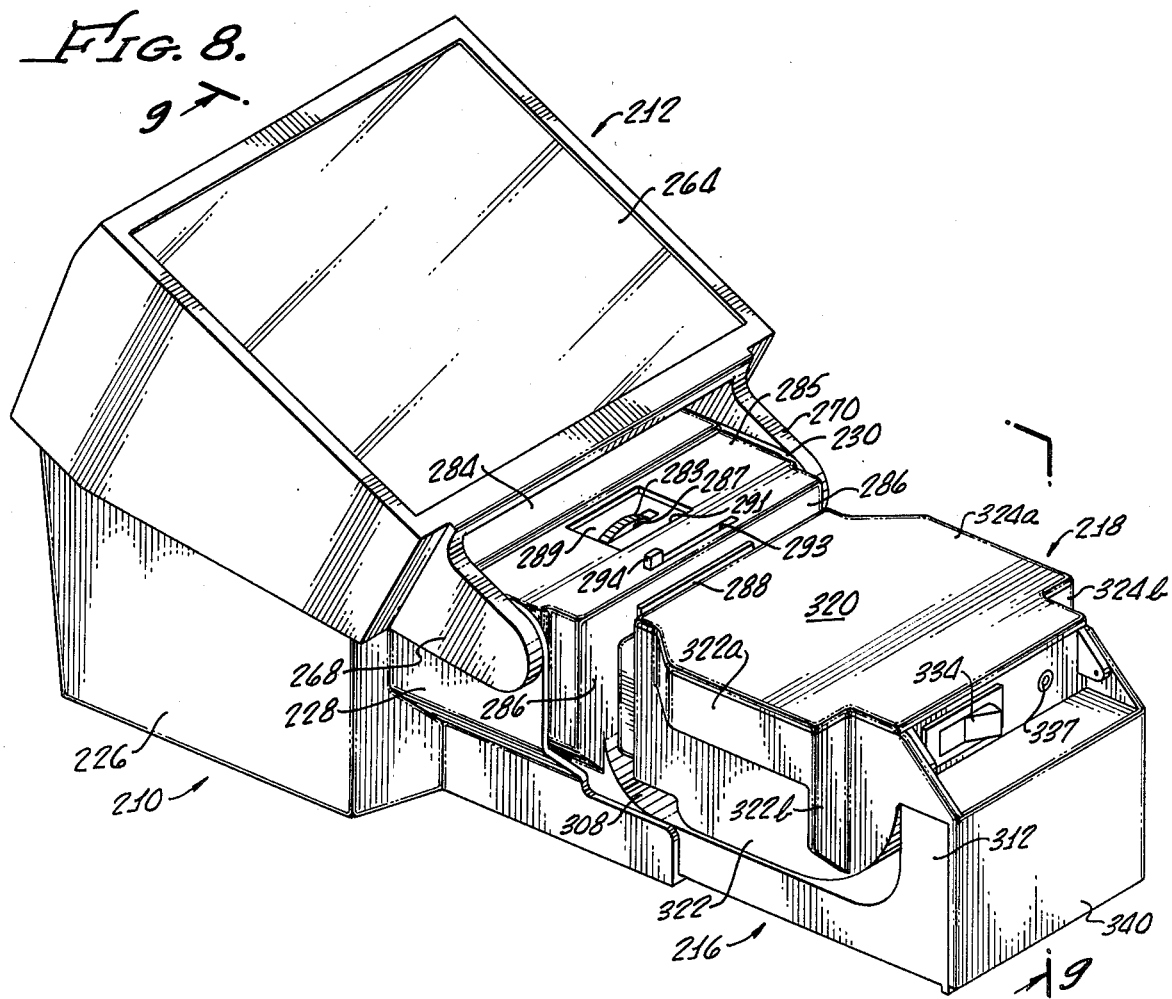

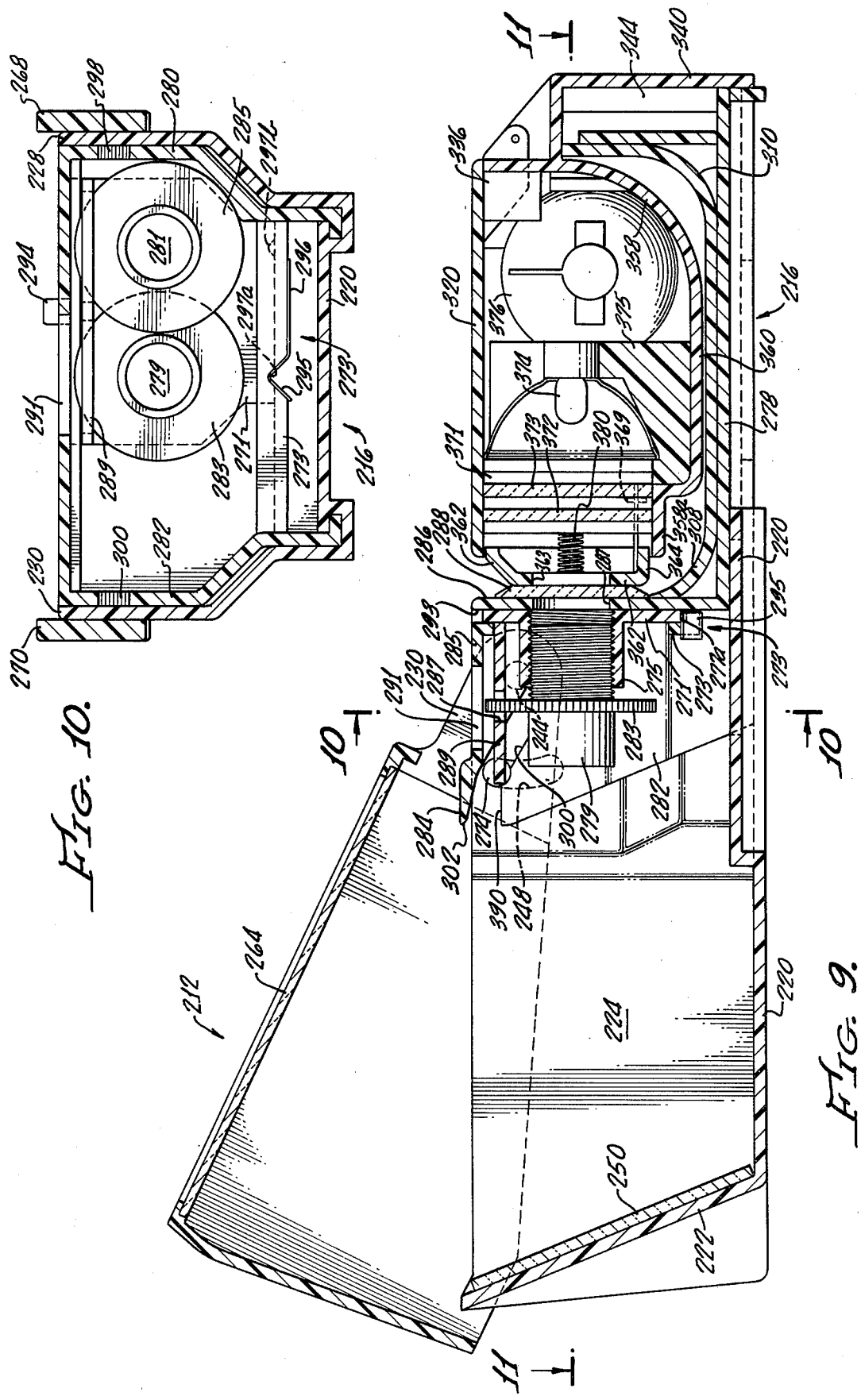

COMPACT COLLAPSIBLE MICROFORM VIEWER

BACKGROUND OF THE INVENTION

The present invention relates to microform viewers and more particularly concerns an improved image projector that facilitates maintenance of film path, and which, in another aspect, readily lends itself to a compact collapsible packaging arrangement of the viewer.

In typical microform viewers selected ones of a number of images formed on a film or microform are projected for enlarged display on the viewer screen. The film is positioned between a light source and projection lens system that projects light to be reflected by one or more mirrors to the viewing screen. To select an image, the film is moved in different directions through a film path which closely confines a chosen portion of the film between a pair of transparent glass flats. A major problem encountered in the use of such viewers is lack of cleanliness of the flats. The flats are exceedingly difficult to clean and maintain in a state of cleanliness because they are so close to each other. In my copending application for Microform Viewer, Ser. No. 066,935 filed Aug. 16, 1979, now U.S. Pat. No. 4,327,974, I have shown a pair of flats that are removable as a unit and, being hingedly connected to each other, can be readily moved apart for cleaning. Nevertheless, relatively complex mechanism and springs are required to removably mount these flats and care must be exercised in the direct handling of the flats themselves for cleaning, removal and insertion.

Accordingly, it is an object of the present invention to provide a projection system which further facilitates maintenance of film positioning structure.

Partly because of the small size of the images to be viewed in the microform viewer, a relatively long optical path is employed to obtain required magnification. Even with optimum bending or folding of the optical path, required viewer size is inherently incompatible with optimum compactness desired for ready handling and portability. To this end, collapsible viewers have been devised. Various types of folding and expandable mirror and screen arrangements have been provided. Film and lens systems have been shifted to extend the optical path for viewing at proper magnification. Typical of such arrangements is the viewer shown in the patent to Edelstein, U.S. Pat. No. 3,899,246, in which a pair of mirror sections, folded together to form sides of the viewer case, are pivoted outwardly to provide an elongated optical path. A folding mirror arrangement is also shown in my co-pending patent application identified above. In the Edelstein patent, the degree of magnification may be changed by moving the entire film and lens section toward and away from the reflectors and, moreover, this section may be entirely detached for projection on a fully displaced and more remote screen. Nevertheless, in the manipulation of these devices, the several moving parts must be separately moved between open and closed positions, requiring several different and independent operations. Yet proper location of all the parts in their desired positions and inadvertent detachment are not adequately assured.

Accordingly, it is another object of this invention to provide a compact collapsible viewer in which a viewing screen is automatically and positively driven between closed and display positions as a projecting section is moved between a collapsed position telescoped within the viewer case and an extended position in which it is withdrawn from its telescoping position. Another object is to provide viewer sections that are readily separable intentionally but not inadvertently.

SUMMARY OF THE INVENTION

In carrying out principles of the present invention in accordance with a preferred embodiment thereof, an optical projector is formed of first and second housings that define a film receiving path therebetween and the two housings are mutually separable at the film receiving path. The film receiving path is formed in part by pressure plates that closely and movably confine a film therebetween and are mounted respectively to the first and second housings so that separation of the housings provides access to the plates. According to another feature of the invention, a microform viewer has a projection section telescopically associated with a case section and slidably mounted thereto for motion between a closed position and an operative position. A screen section is shiftably connected to the case section for movement between retracted and display positions and means are provided for interconnecting the projection and screen sections to drive the screen section between retracted and display positions in response to motion of the projection section between closed and operative positions. Solely in a particular intermediate position the projection section is completely separable from the case and screen sections, in one embodiment.

BRIEF DESCRIPTION OF THE DRAWINGS

FIG. 3 is a section taken on lines 3—3 of FIG. 2;

FIG. 4 is a section taken on lines 4—4 of FIG. 3;

FIG. 5 is an exploded pictorial view showing the four major parts of the viewer FIGS. 1-4;

FIG. 6 is a pictorial view of one of the projector section housings;

FIG. 7 illustrates a modified form of viewer in closed condition;

FIG. 8 shows the viewer of FIG. 7 in extended position;

FIG. 9 is a section, taken on lines 9—9 of FIG. 8;

FIGS. 10 and 11 are sections, taken on lines 10—10 and 11—11 of the viewer of FIG. 9;

DETAILED DESCRIPTION

Figure 1:
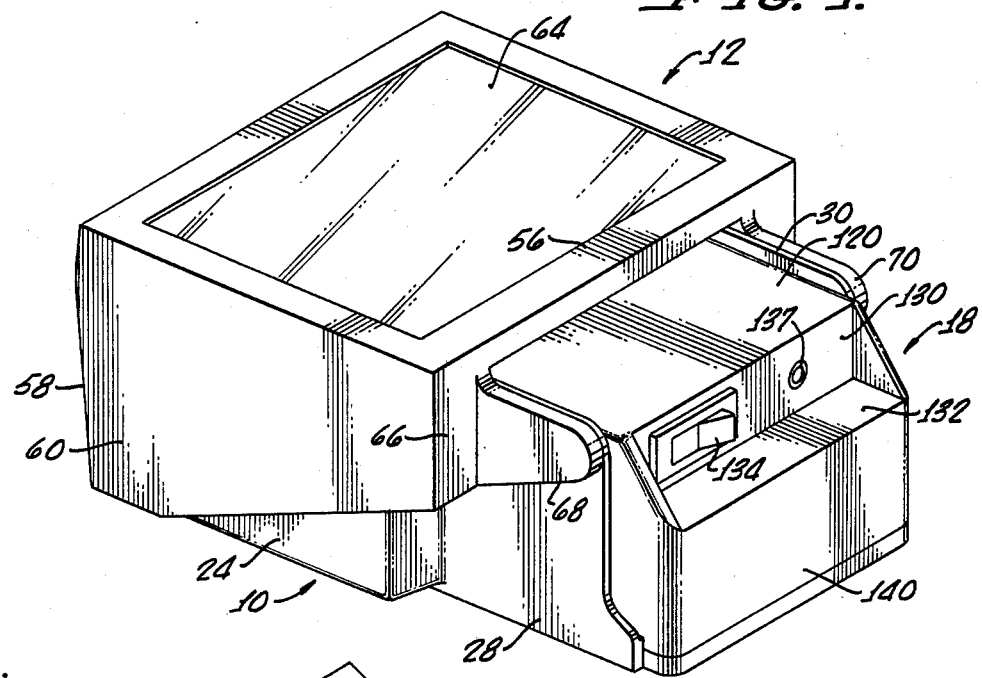
FIG. 1 is a pictorial illustration of a microform viewer embodying principles of the present invention, illustrated in closed condition.
Figure 2:
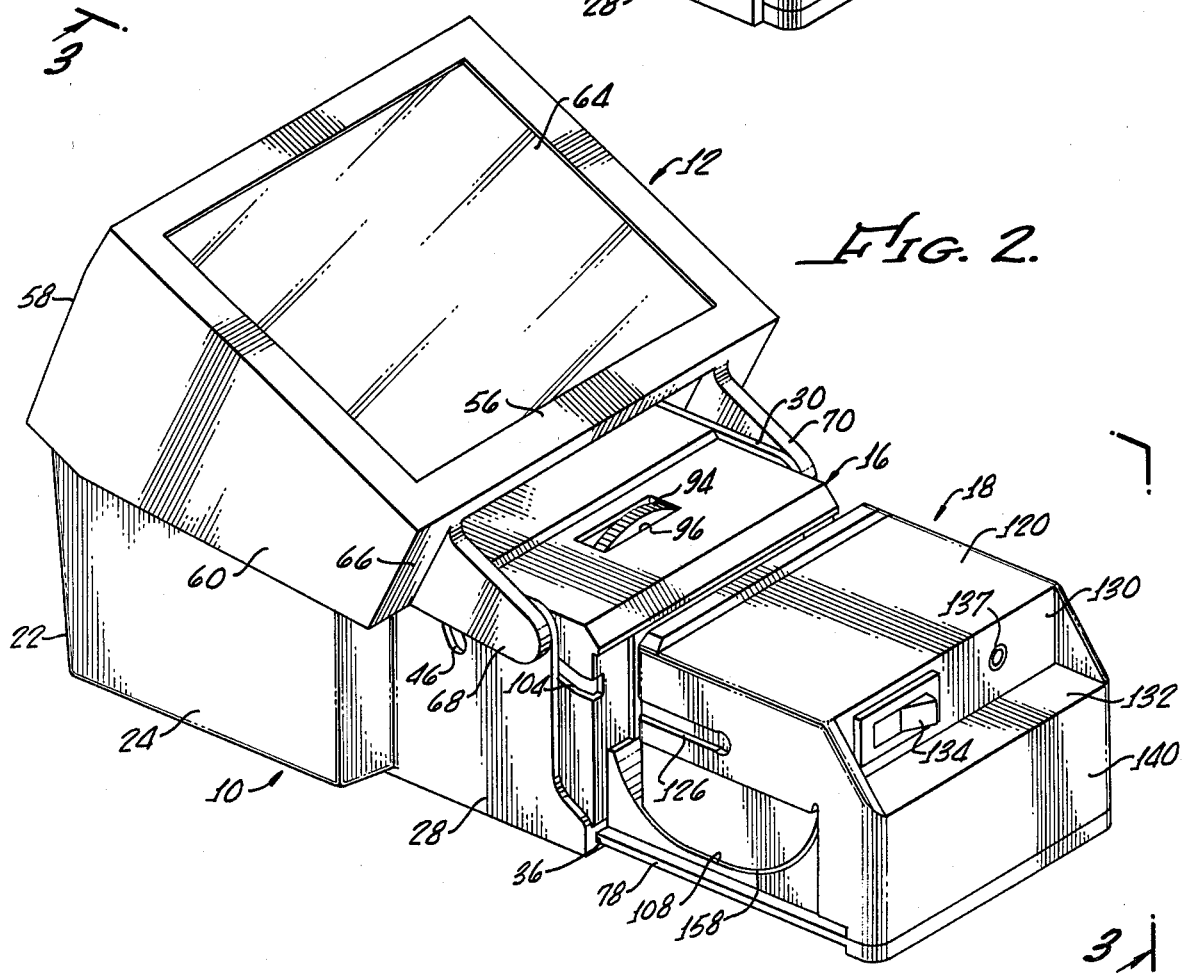
FIG. 2 is a view similar to FIG. 1 showing the viewer of FIG. 1 in operative position.

Referring now to FIGS. 1-6, the microform viewer of the present invention is formed of three main sections, a case section 10, a screen section 12 and a two-part projection section 14. As can best seen in FIG. 5, the two-part projection section 14 includes a first housing 16 and a second housing 18 separably connected to the first housing. Case section 10 is a generally rectangular hollow housing open at both top and rear and includes a bottom wall 20, a forward wall 22 and sidewalls 24,26. The sidewalls each have rear end portions 28,30 that are spaced more closely together than are the sidewalls 24,26. The relatively close spacing of rear sidewall portions 28,30 provides for a snug fit about the projection section and provides an enlarged portion of the case section cooperating with the screen section 12. Longitudinally extending inwardly projecting flanges 32,34 are fixed to the case section sidewalls adjacent to but spaced above the bottom 20 to provide longitudinally extending guide ways 36,38. Fixed mutually aligned pivot pins 42,44 extend laterally outwardly from upper rear corners of sidewall portions 28,30 and arcuate slots 46,48 formed in these sidewall portions have curvatures centered upon the common axis of the pivot pins 42,44. A mirror 50 is mounted within the case section, extending at an angle upwardly and forwardly from the bottom wall 20 to the upper edge of the front wall 22 and exxtending from side to side between the sidewalls 24,26.

Screen section 12 is pivoted to the case section and is formed of a generally rectangular upper frame member 56 having a front wall 58 and sidewalls 60,62. A viewing screen 64 is fixedly mounted within the frame 56. The screen section has a front wall 66 formed with a laterally elongated opening that straddles the case section rear wall portions 28,30 in closed position. Fixed to and extending rearwardly from the rear wall 66 are a pair of spaced ears 68,70 formed with coaxial pivot apertures of which only that indicated at 72 is shown (there being a mating aperture on the inner surface of ear 68). These apertures pivotally receive pivot pins 42,44 to thereby mount the screen section 12 for pivotal motion from its retracted position as shown in FIG. 1, to a display position shown in FIGS. 2 and 3. In retracted position, the screen closely overlies the upper edges of the case section and the several walls of the screen section telescopically receive the corresponding walls of the case section, whereas in display position, the screen section and the screen 64 are displaced from the case section.

Ears 68,70 are formed with a pair of inwardly projecting mutually aligned cam pins of which only one, indicated at 74, is shown in FIG. 5. These two cam pins (there being a corresponding cam pin projecting inwardly from the ear 68) extend through and slightly beyond the arcuate apertures 46,48 formed in case section walls 28,30 and cooperate with camming means (to be described below) on the projection section so that the screen is directly and positively driven between retracted and display positions by motion of the projection section between closed and operable positions.

The projection section 16 is mounted upon a flat generally rectangular base 78 of which the edges form a pair of guides slidably received in the guide ways 36,38 of the case section, to allow the projection section to telescope into and out of the case section. Base 78 forms the bottom of the first or lens housing which includes a lens compartment formed by sidewalls 80,82, upper or top wall 84, and a rearwardly facing wall 86 in which is mounted a pressure plate in the form of a transparent optical glass flat 88. Rear wall 86 is apertured and carries a fixed forwardly extending internally threaded sleeve 90 (FIG. 3) in which is threaded a lens 92 having an externally threaded rear end portion and a fixed focusing thumb wheel 94 of an enlarged diameter that enables the thumb wheel 94 to project slightly above the top wall 84 through a slot 96 formed therein.

Sidewalls 80,82 of the first housing are made of double thickness and outwardly opening angulated cam slots 98,100 are formed therein to receive the respective cam pins 74 inwardly projecting from the screen section ears 68,70 through the case section wall slots 46,48. Cam slots 98,100 include an upper substantially horizontal portion 102 (FIG. 5), a downwardly and rearwardly inclined portion 104 and a short rearwardly horizontal portion 106.

Rear wall 86 and flat 88 of the first housing form a substantially flat rearwardly facing surface that defines one portion of a film receiving path. A curved wall 108 extends rearwardly and downwardly from the lowermost portion of flat 88, providing a continuation of the surface of this flat, and thence curves upwardly to a rearmost end 110. Fixed to the end 110 of curved wall 108 and to the bottom plate 78 are upstanding side wall sections 112,114 terminating in inwardly directed rear flanges 116,118 that extend for a substantial vertical distance. These flanges form vertically extending guides that help to detachably receive the separable second housing of the projection section.

The second or lamp housing of the projection section includes an upper wall 120, and sidewalls 122,124 of increased thickness in which are formed outwardly facing cam slot extensions 126,128 that are aligned with and horizontally extend from the rear horizontal end portions 106 of cam slots 98,100. The second housing includes an angulated rear wall having a vertical portion 130 and a horizontal portion 132 forming a recess in which is mounted the operator 134 of a controlling switch 136 (FIG. 3). An external receptacle 137 is mounted in rear wall 130 and electrically connected to provide power through the switch 136 to a projector lamp to be described below. The receptacle is adapted to receive a plug-in electrical cord (which may have a suitable voltage step down transformer) that is to be connected to a power source. A lower rear wall 140 extends downwardly from wall section 132 of the second housing and has fixed forwardly extending flanges 142,144 (FIGS. 4 and 5) which cooperate with vertically extending angulated guide flanges 146,148 to form guide ways that slidably receive the first housing guides 116,118. The second housing section has a curved bottom wall 158 which mates with and is slightly displaced from the wall 108,110 of the first housing section, forming part of the film path.

The second housing section has a front wall 160 (FIG. 6) having an aperture in which is fixed a second pressure plate in the form of an optical glass flat 162, and having relatively short rearwardly extending flanges 163, 163a, 164, 164a which are a hand tight friction fit within the open forward end of the second housing section defined by its upper wall 120, curved bottom wall 158 and sidewalls 122. The front wall 160 and flat 162 are detachable from the front of the lamp housing to provide access to a lamp 164 mounted in a socket 166 upon an upstanding lamp support 168 fixed to the curved bottom wall 158. A reflector 170 and shroud 172 direct light from lamp 162 through the apertured front wall 160 and through the glass flat 162.

It will be seen that each of the two housings of the projection section has a substantially flat surface adjoining a curved surface to define a film receiving path when the two housings are mated and telescopically interengaged as shown in FIG. 3. The film path is provided between the flats 88,162 which precisely position and closely confine the film in the optical path. The film path extends rearwardly and downwardly in a curve from its planar portion between the flats, so that a section of microform may be manually inserted between the upper rearwardly and forwardly facing bevelled edges (see FIG. 3) of the first and second housings, into the film path between the flats.

In use, the viewer is carried and handled in its compact collapsed condition as illustrated in FIG. 1. It is opened simply by withdrawing the projection section from the case section which automatically raises the screen to its display position. The line cord is plugged into receptacle 137, the switch is turned on, and a film strip is manually inserted into the film path. The film strip is manually manipulated until a selected image is displayed on the screen, the image being focused by operation of the focus wheel 94. The lens is readily accessible from the open front end of the first housing of the projection section. The lamp 164 is readily accessible by simply removing the frictionally held front wall 160 and its glass flat 166 from the lamp housing. The glass flats 88 and 162 are readily accessible for cleaning, maintenance, or replacement, if necessary, simply by removing the lamp housing from its telescopic relation with the lens housing, which immediately exposes both the flats and also enables cleaning and maintenance of the remainder of the film path. If deemed necessary or desirable the cam slot may be opened forwardly to enable the projector section to be detached from the case and screen sections.

FIGS. 7-14 illustrate a presently preferred form of viewer having two lenses to provide selected magnification, a more readily adjustable film positioning arrangement and an improved interconnection of the case and projection sections that allow the projection section to be completely withdrawn for use as an independent projector, while significantly minimizing the possibility of inadvertent detachment.

Three main viewer sections include a case section 210, a screen section 212, and a two-part projection section 214 that includes a first or lens housing 216 and a second or lamp housing 218 separably connected to the first housing. Case section 210 is a generally rectangular housing open at both top and rear, and includes a bottom wall 220, forward wall 222, and sidewalls 224, 226. The sidewalls each have rear portions 228, 230 that are spaced more closely together than are the forward sidewalls and provide for a snug fit about the projection section. Bottom wall 220 of the case section is provided with longitudinally extending upwardly open guide channels 232, 234, (FIG. 12) depressed slightly below the bottom wall 220. The latter has laterally outwardly extending guide elements 236, 238 extending partly across the guide channels 232, 234. Guide elements 236, 238 are of a limited longitudinal extent for purposes to be described below.

Figure 12:
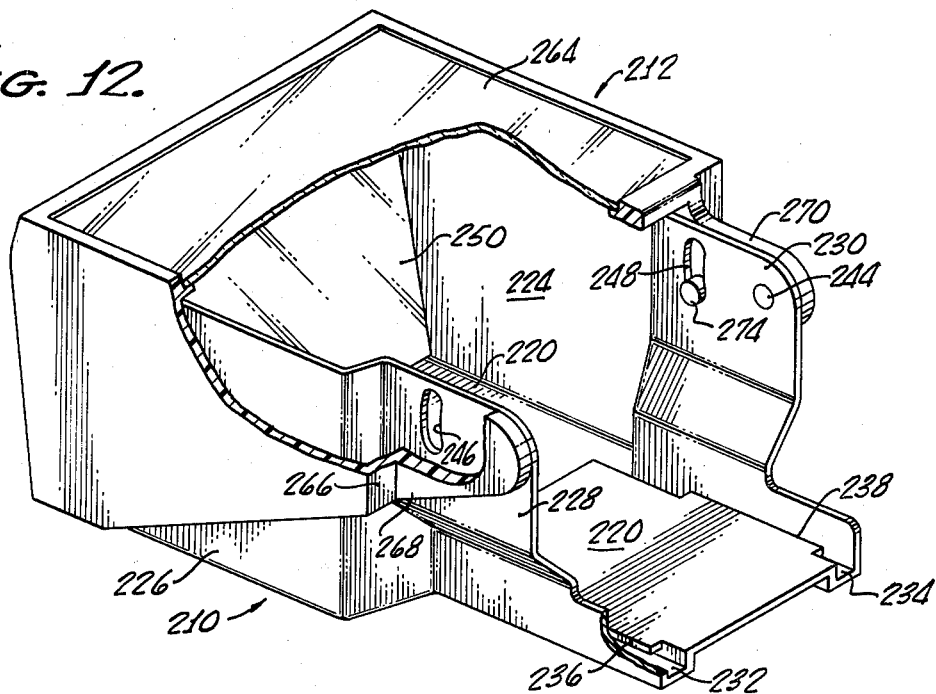
FIG. 12 is a perspective view, with parts broken away, of the case and screen sections of the viewer of FIGS. 7-11.

Fixed coaxial pivot pins, of which that designated at 244 is shown in FIG. 12, extend laterally outwardly from upper rear corners of sidewall portions 228, 230 and arcuate slots 246, 248 formed in these sidewall portions have curvatures centered upon the common axis of the pivot pins. A reflector 250 is mounted at the forward portion of the case section. Screen section 212 is pivoted to the case section and formed of a generally rectangular frame with a viewing screen 264 fixed thereto. The screen section has a front wall 266 formed with an opening straddling the case section rear wall in closed position, and a pair of rearwardly extending, mutually spaced ears 268, 270 having apertures that pivotally receive the case section pivot pins to mount the screen section for its pivotal motion between the retracted position of FIG. 7 and the display position of FIG. 8. Ears 268, 270 are formed with a pair of inwardly projecting mutually aligned cam pins of which one, indicated at 274, is shown in FIG. 12.

The projection section is mounted upon a flat generally rectangular base 278 carrying downwardly spaced and inwardly projecting guide elements 278a, 278b, 278c, and 278d, all spaced below the base 278. The guides on either side of the base plate 278 are each discontinuous, being formed on the one side of a forward guide element 278a and a rear guide element 278b, which are longitudinally spaced from one another by a distance not less than, and preferably slightly greater than, the longitudinal extent of the laterally outwardly projecting guide element 236 on the corresponding side of the case section bottom wall. Similarly, the guide on the other side of the projection base is formed of forward and rear guide elements 278c and 278d which are mutually spaced from one another by a distance not less than, and preferably slightly greater than, the longitudinal extent of the guide element 238 of the case section. This arrangement provides for sliding telescopic guiding of the case and projection sections and allows the two to be detached from one another only at a single position of the projection section relative to the case section, as will be more particularly described below.

Base 278 forms the bottom of a first or lens housing including a lens compartment having sidewalls 280, 282 and upper or top wall 284 having a depressed rear portion 285 and a rearwardly facing wall 286 in which is mounted a film pressure plate in the form of a fixed transparent optical glass flat 288.

Figure 11:
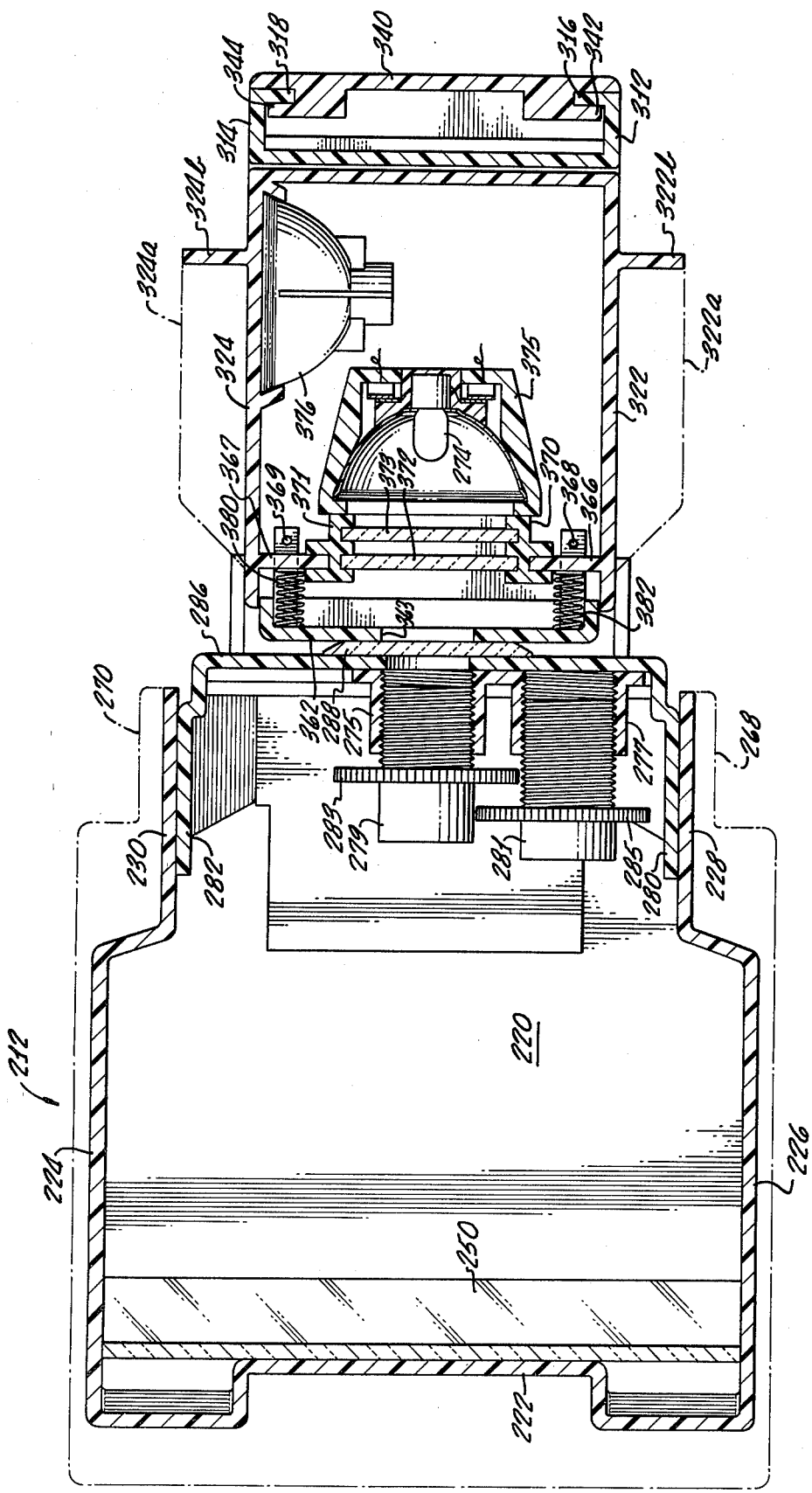

Rear wall 286 is apertured as at 287 and supports a lens carrier that is slidably mounted in the lens housing for transverse motion. The lens carrier includes a rear wall 271 having its lower edge slidably mounted in an upwardly facing lower guideway 273 carried on the wall 286 and fixedly mounting a pair of laterally spaced internally threaded lens sleeves 275, 277 (FIG. 11). Threaded in the lens sleeves for longitudinal focusing adjustment are lenses 279, 281, each having a fixed focusing wheel 283, 285 extending upwardly through a slot 287 in a top wall 289 of the lens carrier.

The rear depressed portion 285 of the top projector wall is formed with a focusing opening 291 that permits access to lens focusing wheels and also has a transversely extending slot 293 through which projects an upwardly extending lens selector actuator 294 that is fixedly connected to the carrier wall 271. Part of the upper edge of the latter extends into slot 293 to guide the carrier.

The guide 273 which slidably retains and guides the lower edge of lens carrier wall 271 is formed with an inverted V-shaped aperture which receives the inverted V-shaped bent end 295 of a resilient carrier latch or spring 296 that is secured to the bottom of the guide 273. The lowermost edge of the carrier wall 271 is formed with a pair of spaced downwardly opening notches 297a and 297b which alternatively receive the bent spring latch 296 to hold the carrier and lenses in one of their two laterally slidable selected positions.

Sidewalls 280, 282 of the lens housing 216 of the projection section are made of increased thickness and outwardly opening inclined slots 298, 300 are formed therein to receive the respective cam pins 274 inwardly projecting from the screen section ears through the case section wall slots. The cam slots 298, 300 include a short forward substantially horizontal portion 302, a downwardly and rearwardly inclined portion 304 and a notched portion 306 formed in the lower edge of each slot just ahead of the forwardmost portion of the inclined slot section 304. Horizontal slot portion 302 opens and slightly diverges forwardly to enable complete separation of the projection and casing sections, as will be described below.

Pressure plate 288 of the lens housing forms a substantially flat, rearwardly facing surface that defines one portion of a film receiving path. A curved wall 308 extends rearwardly and downwardly from the lowermost portion of the flat 288 providing a rearward horizontal continuation of this flat, and thence curves upwardly to a rearmost end 310. Fixed to the curved wall end 310 and to the bottom plate 278, are upstanding rear wall sections 312, 314 (FIG. 11) terminating in inwardly directed rear flanges 316, 318. These parts extend a substantial vertical distance and form vertical guides that help to attachably receive the separable lamp housing of the projection section. The lamp housing includes a pivotally mounted upper wall 320, sidewalls 322, 324 including outwardly projecting overhanging portions 322a, 324a each of which terminates in a vertically extending downwardly projecting rear wall portion 322b and 324b.

The lamp housing includes an angulated rear wall having a recess at its upper end in which is mounted an operator 334 (FIG. 8) of a control switch 336 (FIG. 9). As in the previous embodiment, a receptacle 337 is mounted adjacent the switch operator 334 to enable electric power to be supplied through the switch to the lamp. A lower rear wall 340 extends downwardly and includes a pair of laterally positioned outwardly extending guide elements 342, 344 spaced forwardly of wall 340 and forming outwardly opening guideways that slidably receive flanges 316, 318 of the lens housing. The lamp housing section has a curved bottom wall 358 having a lower horizontal portion 360 terminating in a horizontally extending forward section 358a.

The front wall of the lamp housing is formed by a movable pressure plate 362 apertured as at 363 and pivotally connected at its lower edge 364 to the lower front edge of the forward bottom wall portion 358a of the lamp housing. This pivotal connection is conveniently formed by extending parts of the lower edge 364 rearwardly and loosely through horizontal slots formed in inwardly projecting support walls 366, 367 in which the extensions are captured by pins 368, 369 (FIG. 11).

First and second laterally spaced upstanding supports 370, 371 are fixed to the support walls 366, 367 within the second housing and slidably receive first and second mutually spaced removable heat sinks in the form of transparent glass plates 372, 373. Top wall 320 of the lamp housing is pivoted to the rear upper portions of the sidewalls to enable access to the interior of the lamp housing for the removal of the glass plates 372, 373 and for access to a removable lamp 374 carried in a fixed lamp mounting 375. A spare lamp assembly 376 may be mounted within the lamp housing.

A pair of laterally spaced springs 380, 382 have rearward ends mounted on and bearing against inwardly projecting support walls 366, 367 that are fixed to the sidewalls 322, 324. The forward ends of the springs bear against pressure plate 362 above its lower pivoted edge, and thus resiliently urge this pressure plate against the pressure plate, or glass flat 288, of the lens housing. The pressure plates and the walls of the first and second housings of the projection section mutually cooperate to define a film receiving path therebetween.

The viewer of FIGS. 7-14 is carried and generally handled in its compact folded condition, as illustrated in FIG. 7. It is readied for operation in the same manner as is the viewer of the previous embodiment. The projection section is grasped and withdrawn from its telescoping relation with the case section. Initially, in compact telescoped condition, the driven cam pins 274 lie beneath, but closely adjacent, the overhanging laterally extending wall portions 322a and 324a of the second housing, and thus the screen section 212 is restrained from pivoting from its closed position.

As the projection section is withdrawn, cam pins 274 enter the rear end of the inclined cam slots 298, 300 and the lower surfaces of these cam slots drive the cam pins and screen section upwardly as the projection section is further withdrawn. When the screen section 212 reaches its limiting display position, the cam pins 274 engage the upper ends of arcuate slots 246, 248 and further pivoting of the screen section is prevented. In the fully open position, with the screen in its display position and the projection section withdrawn to its operative position, as illustrated in FIGS. 8 and 9, further withdrawal of the projection section is prevented by the recess 306 and the lower portion 390 of the forward end of the cam slots (See FIG. 9). Lower portion 390 is above the bottom of the drive or cam pins 274 and thus the pins would have to rise beyond the position of FIG. 9 in order to continue further withdrawing motion of the projection or projector section. However, further upward motion of the pins 274 (and further pivotal motion of the screen section) is prevented by their abutment with the upper end of the arcuate slots 246, 248. Recess 306 also acts to restrain inadvertent return of the projection section to closed position.

To separate the projection section from the casing section the projection section must be moved to an intermediate position, between the fully open operative position of FIG. 9 and the closed position of FIG. 7. In such position, as illustrated schematically in FIG. 14, the outwardly projecting guide elements 236 and 238 of the casing section are positioned in registration with the discontinuities or openings between forward and rear portions 278a, 278b, 278c and 278d of the projection section guide elements. Accordingly, in this position the rear portion of the projection section may be tilted upwardly, raising guide elements 278 past casing section guide elements 236, 238 until the rear edge of the forward guide elements 278a and 278c just clear the upper surface of elements 236, 238 to the position illustrated in FIG. 14. Now the projection section may be completely withdrawn. In this partially tilted position of the projection section, the screen section may be tilted upward slightly, but the forward portion 390 of the cam slot and the recess 306 itself have been tilted downwardly so that the restraint of these elements on withdrawal of the projection section no longer exists in this tilted position.

It will be seen that the probability of inadvertent detachment or separation of the projection section is minimized since the projection section must first be moved to a precise intermediate position and then tilted before it is detached, whereas no tilting motion is necessary in the normal operation of moving the projection section between its closed and operative positions.

Figure 14:
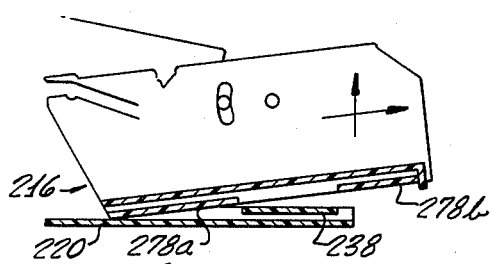
FIG. 14 is a simplified schematic view illustrating the manner in which the projection and case sections of the viewer of FIGS. 7-11 are detachably interconnected.
Figure 13:
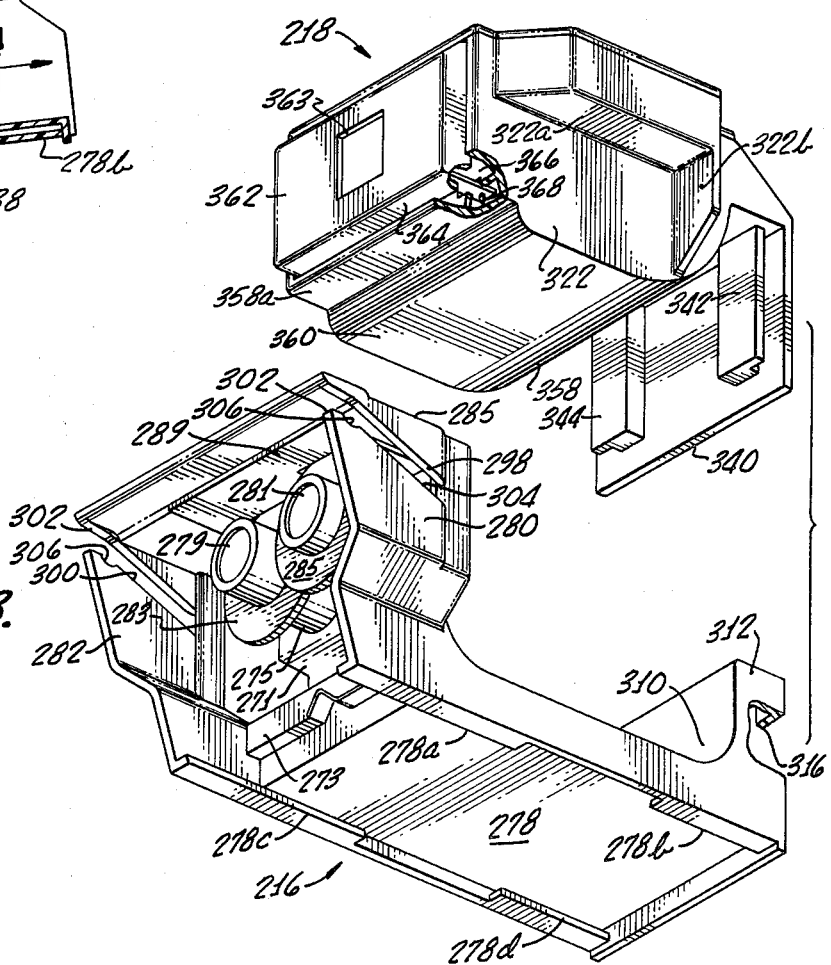
FIG. 13 is an exploded view, looking at the bottoms of the separable housings of the projection section of the viewer of FIGS. 7-11.

Once the projection section has been removed as described in connection with FIG. 14, the lamp housing may be readily separated from the lens housing by sliding the two apart along the several guide elements 316, 318, 342, 344. When the two housings are separated, they separate along the film receiving path the surfaces of which are then readily accessible for maintenance. The self-contained lamp housing, when separated from the lens housing of the projection section, is operable as a self-contained portable light source. Provision of an apertured pressure plate 362 that is resiliently driven toward the other pressure plate enables the projector to readily accommodate microforms of different configurations and different thicknesses, including film elements both with and without frames or mounting structures.

Data stored on microforms is often in one of two different sizes, and thus different microforms may require different amounts of magnification. Accordingly, the viewer described and illustrated in FIGS. 7–14 is provided with two alternatively selectable lenses each of which can be individually focused. The lenses are mounted on the common lens carrier, which, in turn, can be slidably shifted laterally so as to position either one or the other of the lenses in the light path. Both lenses are readily shifted from one position to the other by laterally pushing the upwardly protruding actuator 294. Spring latch 295, 296 helps to position each lens properly and also to hold it in its proper position. Since the uppermost edge of the focusing wheel of each lens is below the lower surface of the housing top wall 285 this wall does not interfere with the slidable motion of the lenses and yet the focusing aperture need be large enough to accommodate access to only a single lens.

There have been described simple, small package collapsible microform viewers expandable to operable positions with minimum effort, and including a projector formed of two separable housings that greatly facilitate maintenance and repair.

The foregoing detailed description is to be clearly understood as given by way of illustration and example only, the spirit and scope of this invention being limited solely by the appended claims.

What is claimed is:

1. A microform viewer comprising
   a case section,
   a projection section telescopically associated with said case section and slidably mounted thereto for motion between a closed position in which at least a portion of the projection section is telescoped within said case section and an operative position in which at least part of the projection section is displaced from the case section, said projection section including means for positioning film bearing an image to be projected, means for illuminating such film, and means for projecting an image of said illuminated film,
   a screen section pivotally connected to said case section for movement between a retracted position adjacent said case section and a display position displaced therefrom, said screen section including a display screen,
   means in said case section for reflecting light from said projection section to said screen, and
   drive means for interconnecting said projection and screen sections to drive said screen section between its retracted and display positions in response to motion of said projection section between its closed and operative positions, said drive means comprising a cam surface on one of said projection and screen sections and a cam fixed to the other of said projection and screen sections in slidable engagement with said cam surface.

2. The viewer of claim 1 wherein said cam surface comprises a forwardly open cam slot on said projection section and wherein said cam comprises a cam pin on said screen section slidably received in said cam slot, said pin being detachable from said open cam slot to allow said projection section to be detached from said case section.

3. The viewer of claim 2 wherein said forwardly open cam slot includes a recess adjacent a forward end thereof tending to resist inadvertent displacement of said projection section from said operative position.

4. The viewer of claim 1 wherein said projection section includes first and second housings defining a film receiving path therebetween, said housings being mutually separable at said film receiving path.

5. The viewer of claim 4 including means for positioning film in said path, said means for positioning including a transparent flat forming a part of said film receiving path and mounted to one of said first and second housings, whereby separation of said housings exposes said flat for cleaning or replacement.

6. The viewer of claim 5 including a pressure plate mounted to the other of said housings, and resilient means for urging said plate toward said flat.

7. The viewer of claim 4 including a pressure plate movably connected at one edge thereof to one of said housings and forming part of said film receiving path, and means for urging said plate toward the other of said housings.

8. The viewer of claim 1 wherein said drive means are mutually detachable, and wherein said projection section is movable to an intermediate position between said closed and operative positions, and is detachable from said screen section when in said intermediate position, and means for preventing detachment of said projection section when in said closed or operative positions.

9. The viewer of claim 8 wherein said projection section is mounted to said case section by interengaging guide elements, said guide elements having release sections free of interengagement when said projection section is in said intermediate position.

10. The viewer of claim 1 wherein said projection section is slidably mounted to said case section by interengaging guide means, said guide means comprising inwardly projecting first guide elements on one of said case and projection sections, each said element having forward and rear portions longitudinally spaced from one another, and outwardly projecting second guide elements on the other of said case and projection sections, each said second guide element having a length not greater than the longitudinal space between forward and rear portions of an associated first guide element, whereby said case and projection sections can be separated from one another by passing said second guide elements through said longitudinal spaces.

11. A microform projector comprising a first housing having a lens for projecting an image of illuminated film,
   a second housing mounted to said first housing and having means for illuminating film bearing an image to be projected,
   said first and second housings defining a film receiving path therebetween, whereby film may be moved and positioned in said path for illumination by light from said first housing, and whereby an image of such illuminated film may be projected by the lens of the second housing, said projector including a case section, said first and second housings being slidably mounted to said case section for motion between a closed position in which at least a portion of one of said housings is telescoped within said case section and an operating position in which at least one of said housings is displaced from said case section, a screen section mounted to said case section for movement between a retracted position adjacent said case section and a display position displaced therefrom, said screen section including a display screen, and actuating means interconnecting at least one of said housings and said screen section for driving the screen section between its retracted and display positions in response to motion of said one housing between its closed and operative positions.

12. The projector of claim 11 wherein said screen section is pivotally connected to said case section and wherein said actuating means comprises detachably interengaged cam pin and slot means on said screen section and one of said housings, said first and second housings and said case section having detachably interengaged guide elements forming at least part of the slidable mounting of said housings to said case section.

13. The projector of claim 11 wherein said housings are mutually separable at said film receiving path.

14. A compact collapsible microform viewer comprising an open case section having a bottom, a forward wall, a pair of mutually spaced sidewalls and first and second laterally projecting pivot elements fixed to rear portions of said sidewalls, first and second arcuate slots formed in said sidewalls, said section having first and second mutually spaced guide elements extending forwardly from the rear of said case section, a reflector mounted in said case section adjacent said forward wall, a screen section having a display screen mounted thereon and having a pair of mutually spaced rearwardly extending mounting brackets, each bracket having a pivotal connection to one of said case section pivot elements, said screen section also including cam means fixed thereto, a projection section comprising a housing telescopically associated with said case section and having longitudinally extending guide elements engaged with said case section guide elements to slidably mount the projection section to the case section for motion between a closed position in which at least a portion of the projection section is telescoped within said case section and an operative position in which the projection section is at least partly displaced from the case section, and cam means on said projection section engaged with the cam means of said screen section for pivoting said screen section relative to said case section in response to motion of the projection section between its closed and operative positions.

15. The viewer of claim 14 wherein at least some of said guide elements are discontinuous to permit separation of said projection and case sections at an intermediate position between said closed and operative positions.

16. The viewer of claim 14 wherein each guide element of one of said projection and case sections is discontinuous and has a forward and rear portion longitudinally spaced from one another by a distance not less than the length of the guide elements of the other of said projection and case sections.

17. The viewer of claim 16 wherein said screen section cam means comprise a pair of inwardly extendng cam pins fixed to said screen section and extending through said first and second slots of said case section, and wherein said projection section cam means comprises first and second outwardly facing open ended cam slots formed in said projection section and receiving said screen section cam pins, whereby said cam pins may slide into and out of said slot through the open ends thereof.

18. The viewer of claim 14 wherein said projection section includes first and second housings defining a film receiving path therebetween, said housings being mutually separable at said film receiving path.

19. The viewer of claim 14 wherein said projection section includes a base, a first housing mounted on said base, a second housing mounted on said first housing and defining therewith a film receiving path, said first and second housings being separable from one another along said path.

20. The viewer of claim 19 wherein said first housing includes a substantially flat rearwardly facing surface and a second curved surface extending rearwardly therefrom, and wherein said second housing includes a substantially flat forwardly facing surface and a second curved surface extending rearwardly therefrom, said housings including slidably interconnected guide means for slidably and detachably mounting said second housing to said first housing for motion between a connected position in which the surfaces of said first housing are positioned closely adjacent and substantially parallel to corresponding surfaces of said second housing to define therewith a film receiving path, and a second position in which said first and second housings are detached from one another to facilitate access to said surfaces.

* * * * *